United States Patent
Dal Ceredo

(10) Patent No.: US 10,451,481 B2
(45) Date of Patent: Oct. 22, 2019

(54) DEVICE FOR DETECTING THE COLOR OF HIDES AND THE LIKE

(71) Applicant: GER Elettronica S.r.l., Montecchio Maggiore (IT)

(72) Inventor: Giuliano Dal Ceredo, Trissino (IT)

(*) Notice: Subject to any disclaimer, the term of this patent is extended or adjusted under 35 U.S.C. 154(b) by 0 days.

(21) Appl. No.: 16/081,908

(22) PCT Filed: Mar. 8, 2017

(86) PCT No.: PCT/IB2017/051355
§ 371 (c)(1),
(2) Date: Sep. 2, 2018

(87) PCT Pub. No.: WO2017/153929
PCT Pub. Date: Sep. 14, 2017

(65) Prior Publication Data
US 2019/0107441 A1   Apr. 11, 2019

(30) Foreign Application Priority Data
Mar. 9, 2016   (IT) .............................. UA2016A1497

(51) Int. Cl.
*G01J 3/46* (2006.01)
*G01J 3/02* (2006.01)
*G01J 3/51* (2006.01)

(52) U.S. Cl.
CPC ............. *G01J 3/463* (2013.01); *G01J 3/0202* (2013.01); *G01J 3/0278* (2013.01);
(Continued)

(58) Field of Classification Search
CPC ........ G01J 3/463; G01J 3/0202; G01J 3/0278; G01J 3/0289; G01J 3/465; G01J 3/51
See application file for complete search history.

(56) References Cited

U.S. PATENT DOCUMENTS 3,707,123 A    12/1972  Heasman
5,986,769 A *  11/1999  Krzyminski .............. G01J 3/50
                                                              356/445
(Continued)

FOREIGN PATENT DOCUMENTS

DE          19737703          3/1999
DE    102006061997 A1 *  6/2008   .......... B41F 33/0036
(Continued)

OTHER PUBLICATIONS

English Machine Translation of DE 102006061997 (Year: 2006).*

*Primary Examiner* — Dominic J Bologna
(74) *Attorney, Agent, or Firm* — Themis Law

(57) ABSTRACT

A device for detecting the color of leather hides, which is installable on machines and/or in plants for processing and/or managing leather hides, includes a surface for supporting a leather hide of which the color is to be detected, a light source emitting a light radiation of known spectral composition onto the leather hide, an optical sensor capturing the light radiation emitted from the light source and reflected from the leather hide, a member positioned at the optical sensor and keeping the distance constant between the optical sensor and the leather hide, an optical filter associated to the optical sensor to extract the values of the chromatic components of the light radiation captured by the optical sensor, and a processing unit receiving the values of the chromatic components and comparing those values with preset reference values and/or calculating and identifying the corresponding color.

20 Claims, 2 Drawing Sheets

(52) U.S. Cl.
CPC ............. *G01J 3/0289* (2013.01); *G01J 3/465* (2013.01); *G01J 3/51* (2013.01)

(56) References Cited

U.S. PATENT DOCUMENTS

| | | | | |
|---|---|---|---|---|
| 6,090,158 | A | * | 7/2000 | McLaughlin .......... D06C 23/02 223/1 |
| 6,157,730 | A | * | 12/2000 | Roever .................. G01N 21/89 382/110 |
| 2002/0014577 | A1 | * | 2/2002 | Ulrich ................ G01B 11/2513 250/205 |
| 2002/0126328 | A1 | * | 9/2002 | Lehmeier ................ G01J 3/46 358/518 |
| 2005/0072908 | A1 | * | 4/2005 | Grunert ..................... G01J 3/51 250/226 |
| 2010/0328667 | A1 | * | 12/2010 | Wegmuller ............... G01J 3/02 356/402 |
| 2012/0128027 | A1 | | 5/2012 | Park |

FOREIGN PATENT DOCUMENTS

| | | |
|---|---|---|
| EP | 0666363 | 8/1995 |
| EP | 1935646 | 6/2008 |
| WO | 9516909 | 6/1995 |
| WO | 9729368 | 8/1997 |
| WO | 2008144717 | 11/2008 |

\* cited by examiner

DEVICE FOR DETECTING THE COLOR OF HIDES AND THE LIKE

FIELD OF THE INVENTION

The present invention relates to a device for detecting the color of leather hides and the like, to be installed on machines and/or plants for processing and/or managing leather hides and the like.

BACKGROUND OF THE INVENTION

Within the context of processing leather hides, the final color of the leather hide itself is a particularly important parameter for judging both the quality and the repeatability of the coloring processing. The latter in particular serves to give the base color to the leather hide and is carried out by means of spraying a nebulized liquid, generally a pigment, or by means of applying a paint or a fixative. In particular, it is required for the color to be homogeneously applied over the whole surface of the leather hide.

Within this context, it is also required for the leather hides to be processed, belonging to a same lot or also to two different lots, to have the same starting color gradation.

In the current state, to detect the color of the leather hide, colorimeters are used which randomly come in contact with the leather hide, or laboratory spectrophotometers are used, both arranged inside and/or downstream of the painting process.

However, these apparatuses are separate and independent from the processing plant and are not satisfactory because they require slowing down or even interrupting the processing process, with subsequent decrease in plant productivity; moreover, they require the use of dedicated personnel, with subsequent increase in costs. Indeed, the operator should pick a sample from the line and bring it to the laboratory to perform the analysis under perfectly favorable conditions.

Moreover, this type of check is performed randomly and therefore does not ensure that the color has been applied in a homogeneous, repeatable and qualitatively satisfactory manner to all leather hides processed, or in all the areas of a given leather hide.

Finally, the color detections performed often are not completely reliable and this is mainly due to the difficulty in keeping constant the distance between the system for detecting the color and the leather hide to be detected, due mainly to the flexibility and intrinsic decreased stiffness of the leather hide itself.

It is also worth pointing out that unlike other two-dimensional items, such as for example regular sheets of paper, leather hides and/or the like have a weft and a surface aspect (texture) which is not regular and repetitive, rather it is highly variable both between the different types of leather hides and within the same leather hide sample.

Therefore, it is understood how the continuous detection in line of leather hides and/or the like to date is particularly laborious and generally not reliable since it is rather frequent for the variations in color detected not to be actually present in the sample, but in reality to derive from a false detection due to the variation of textures of the sample leather hide itself and/or to the presence of creases or surface defects.

To this end, it is worth noting that EP1935646 describes a device used for checking, more than for measuring, the color of the upper sheet of a stack of paper sheets which, as mentioned, are not similar to leather hides and/or the like. In particular, the device comprises a movable body in which a sensor is mounted, which conveniently is positioned and moves so as to detect the color data of a print control strip which is specifically printed in color by a traditional offset printing machine, on said sheets stacked on top of one another.

SUMMARY OF THE INVENTION

It is the object of the present invention to make a device for detecting the color of leather hides and the like which can be installed on machines and/or plants for processing and/or managing leather hides and the like and which overcomes the drawbacks of traditional solutions due to the possibility of detecting the color of the leather hides in a continuous, accurate, reliable and repeatable manner during the normal operation of the plant in which the device is installed.

It is another object of the invention to make a device which is completely automated and can be installed in line in plants for processing leather hides and/or the like, and in particular can be installed also upstream of the finishing process.

It is another object of the invention to make a device which is capable of detecting and checking the quality, homogeneity and repeatability of the color over the whole extension of a same leather hide.

It is another object of the invention to make a device which is capable of detecting, checking and assessing the quality, homogeneity and repeatability of the color between different leather hides belonging to the same lot or to different lots.

It is another object of the invention to make a device which automatically informs the operator of the presence of possible color variations with respect to a reference color, of the leather hide or leather hides processed or to be processed in order to thus allow a prompt intervention by the same operator.

It is another object of the invention to make a device which provides the operator, and also the client for which the leather hide is intended, with an accurate indication of the color applied to the leather hide itself, and also with a certification of the quality of the color applied and therefore of the final result.

It is another object of the invention to make a reliable device which does not require slowing down or blocking the plant for processing and/or managing leather hides.

It is another object of the invention to propose a device which completely eliminates any intervention by the operator.

It is another object of the invention to make a device which is simple and affordable to construct, which can also be installed in existing and operating plants.

It is another object of the invention to propose a device which has an alternative and/or improved characterization with respect to traditional ones, both in terms of construction and operation.

All these objects, both individually and in any combination thereof, and others which will become apparent from the description below, are achieved according to the invention with a device for detecting the color of leather hides and as defined hereinafter.

BRIEF DESCRIPTION OF THE DRAWINGS

The present invention is hereinbelow further clarified in certain preferred embodiments thereof, which are described by mere way of non-limiting example, with reference to the accompanying drawings, in which.

BRIEF DESCRIPTION OF THE DRAWINGS

Figure 1:
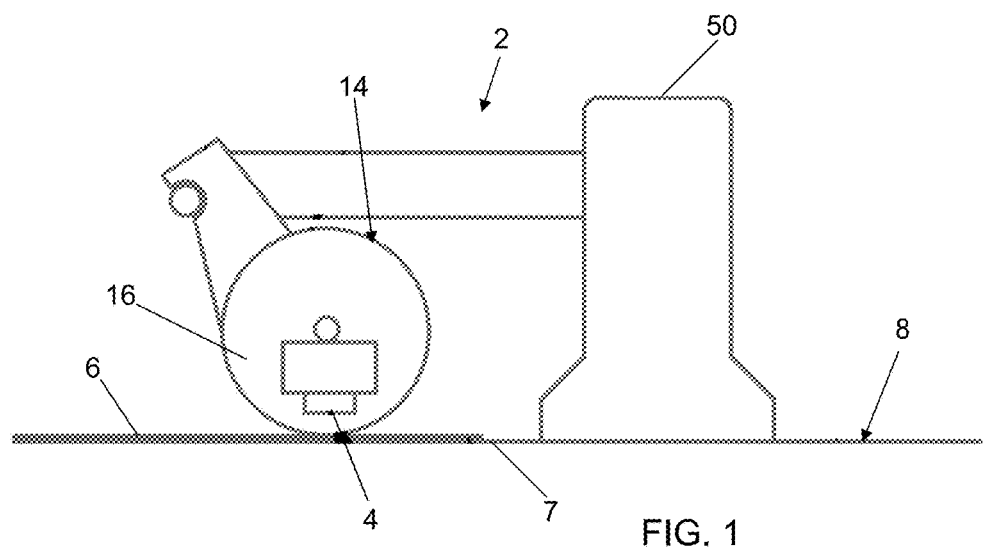
FIG. 1 shows an enlarged perspective view of the device according to the invention.
Figure 2:
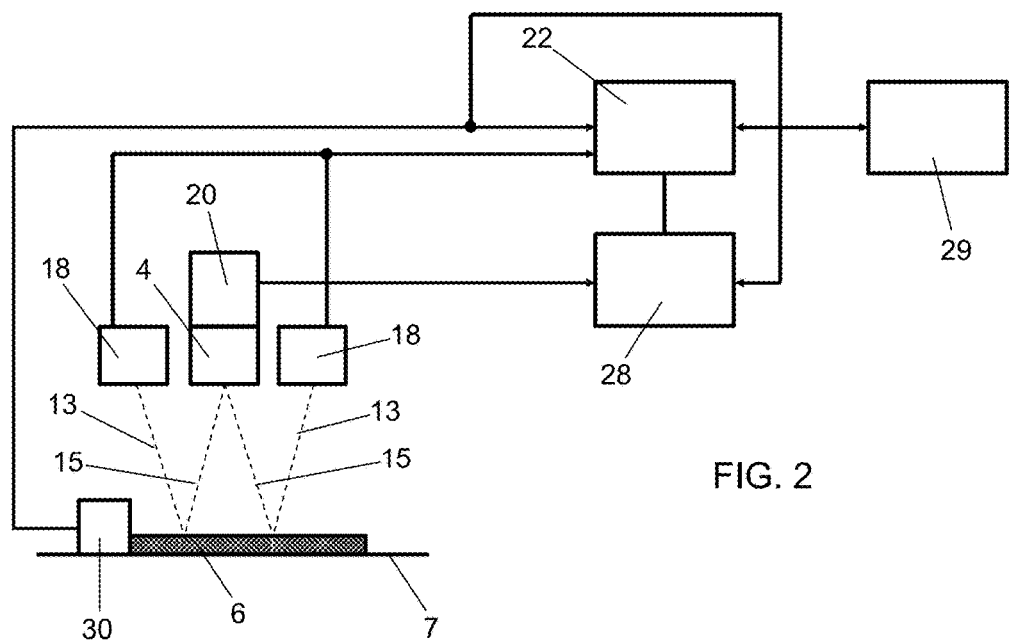
FIG. 2 shows it in a block diagram.

As shown in the drawings, device 2 for detecting the color of leather hides and/or the like according to the invention, comprises an optical sensor 4 arranged so as to capture the light radiation reflected from a leather hide 6, of which the color is to be detected, positioned on a supporting surface 7 consisting of the table or the conveyor belt 8 of a machine 10 or of a plant 12 for processing and/or managing leather hides.

It is understood that "leather hide and/or the like" herein mean two-dimensional items made of natural and/or synthetic leather hide or of other synthetic materials, for example plastics, with features similar or at least common to leather hide, and in general two-dimensional items to be used in the leathergoods industry. Preferably, items made of leather hide and/or the like of which the color is to be detected relate to finished or substantially finished items which are obtained in the final steps of the processing and/or finishing processes of the leather hide itself.

Advantageously, the supporting surface 7 may be flat or have a projection of suitable shape, for example semicircular.

The optical sensor 4 is accommodated inside a protective support 14 which preferably is made of optical glass and/or of transparent material and/or is provided with at least one opening at the area interposed between the optical sensor 4 and the conveyor belt 8 on which the leather hide is supported.

Conveniently, to ensure sensor 4 is always and constantly at the same distance with respect to the surface of leather hide 6, which may have different and variable thicknesses, the protective support 14 consists of an idler roll 16 arranged and supported to press and keep the leather hide 6 uniformly stretched out on the supporting surface 7, and also to keep constant the distance of said leather hide 6 from sensor 4. Advantageously, the means for keeping constant the distance between the optical sensor 4 and the surface of the leather hide 6 which is positioned on the supporting surface 7 comprise blower devices which send jets of compressed air onto the leather hide so as to stretch it out and keep it adherent to the supporting surface itself. Conveniently, said means may also comprise sliding blocks.

Advantageously, to stretch out the leather hide 6, and also to ensure that the distance of said leather hide 6 is and remains constant from sensor 4, a lower roller (not depicted) may be provided which at sensor 4 raises from below the leather hide 6 advancing on the conveyor belt 8.

Device 2 also comprises a light source 18 which emits an incident light radiation of known spectral composition onto the leather hide 6 positioned and stretched out on the supporting surface 7 of the table, or from the conveyor belt 8 of a machine 10 or of a plant 12 for processing and/or managing leather hides.

Advantageously, the light source 18 may be accommodated inside the protective support 14 or alternatively, it may also be accommodated outside the latter.

In particular, the light source 18 comprises a group of controlled wavelength white LEDs. In particular, the white light, of known spectrum, is generated by constant-current controlled LEDs and any feature differences of the LEDs conveniently are compensated for during the initial calibration step. Preferably, the light source 18 is positioned so that the light radiation 13 emitted thereby and incident on the leather hide 8, and the radiation 15 reflected from the leather hide itself and captured by sensor 4, mutually form an angle of about 45°. This type of arrangement is particularly advantageous because it allows the specular component of the light radiation to be avoided, which is the cause of possible distorted measurements.

The optical sensor 4, which for example comprises a matrix of photodiodes and/or uses the CCD or CMOS technology, is associated with means 20 prepared and configured to extract and calculate the chromatic components (or tristimulus values) of the light radiation emitted by source 18, which is reflected from the leather hide 6 and is captured by sensor 4. In particular, such means 20 comprise a set of three bandpass filters: one which lets only the red wavelengths pass, one which lets only the green wavelengths pass and one which lets only the blue wavelengths pass.

Advantageously, the optical sensor 4 is associated with an actuator (not depicted), for example an air piston, for conveniently adjusting the distance in height between the sensor itself and the supporting surface 7 of said leather hide 6. Conveniently, the actuator allows the optical sensor 4 to be moved closer, preferably at a distance of about 6 to 12 mm, with respect to the supporting surface 7.

The optical sensor 4 also comprises a mechanical diaphragm for limiting the detection area on the leather hide 6. Conveniently, the opening of the mechanical diaphragm is controlled according to the distance of sensor 4 from the leather hide itself so as to define a detection area on the leather hide 6 which preferably is circular in shape and has a particularly small diameter, preferably of about 4 to 10 mm.

Preferably, the diameter of the circular detection area varies according to the distance between the sensor and the leather hide itself, according to the following table:

| Distance between the sensor and the leather hide (mm) | 12 | 11 | 10 | 9 | 8 | 7 | 6 |
|---|---|---|---|---|---|---|---|
| Diameter of the circular detection area on the leather hide (mm) | 10 | 9.2 | 8.3 | 7.4 | 6.5 | 5.6 | 4.7 |

Advantageously, such an aspect combined with the use of a light source 18 of known and particularly high intensity, preferably of about 41 lumen, allows dominating, and thus making unimportant, the contribution of the external ambient light. Conveniently, the fact that the leather hide 6 is particularly close to sensor 4, that the detection area on the leather hide 6 is particularly small, and that the light intensity is particularly high, allow favorable conditions to be defined in order to obtain an accurate detection of the color of the leather hide 6.

The device also comprises a control unit 22, preferably implemented by means of a microprocessor; it is electrically connected to the light source 18 and/or to sensor 4 and is configured to conveniently control the activation and/or synchronization thereof.

Advantageously, there are provided one or more detectors, such as e.g. photocells, arranged upstream and/or downstream of the optical sensor 4 and of the light source 18, which are connected with the control unit 22 and are configured to detect the inlet and the outlet, respectively, of the leather hide 6 at the action area of said optical sensor (4) and/or of the light source (18), and thus to send corresponding trigger signals to the control unit 22.

Advantageously, the control unit 22 may be integrated in sensor 4 or may be made separately therefrom and be accommodated inside or outside the protective support 14 thereof.

The device also comprises a processing unit 28 which may be incorporated in or external to the protective support 14 of sensor 4. Moreover, it is understood that the control unit 22 and the processing unit 28 may also be implemented in a same processor or in two separate processors. Conveniently, the processing unit 28 of the device may be implemented in a processor 29, such as for example an external PC or the same processor as the central unit of machine 10 or as the plant 12 on which device 2 is installed.

In particular, the processing unit 28 is set so as to know the spectral composition of the light radiation emitted by the light source 18, and it receives the proportions of the three chromatic components (that is tristimulus values X, Y and Z) calculated by the means 20 starting from the light radiation captured by sensor 4.

Preferably, the values of the light radiation reflected from the leather hide 6 and captured by the optical sensor 4 are transmitted continuously to the microcontroller of the processing unit 28 or at a preset frequency that can be set (e.g. of about 350 ms).

Preferably, the activation of the actuator associated with the optical sensor 4 in order to allow a correct positioning in height of the latter, the activation/deactivation of the acquisition by the optical sensor 4, and also the transmission of the values of the light radiation reflected from the leather hide 6 and captured by the sensor itself, are controlled by a trigger inlet and/or outlet generated and sent by the detectors (photocells) to the control unit 22 and/or to the processing unit 28.

Advantageously, the processing unit 28 is configured to process the three chromatic components so as to bring them in a different color space, preferably in the color space L*a*b* (also known as CIELAB or CIE 1976), in which "L*" indicates the luminosity while "a*" and "b*" indicate the chromaticity coordinates for the color-opponent dimensions.

Substantially, therefore, the processing unit 28 receives the input of the values of the three chromatic components and/or the coordinates in the preselected color space, preferably L*a*b*, and is configured to identify the color corresponding to such values. In particular, to do this, the aforesaid values related to the light radiation captured by sensor 4 are compared with the ones of a color map saved in the processing unit itself so as to identify among them the color code of the leather hide 6 and thus associate it with the leather hide itself.

Advantageously, the processing unit 28 is also configured to compare the values of the three chromatic components and/or of the coordinates in the preselected color space, preferably L*a*b*, with the predefined values that identify a specific reference/desired color for a given leather hide and/or for the leather hides of a given lot.

Conveniently, the processing unit 28 is also prepared for sending suitable signals to the operator and/or for communicating thereto that the results obtained are or are not within a given presettable tolerance range.

Advantageously, device 2 also comprises means 30, e.g. an encoder, for measuring the advancing of the leather hide 6 on the table or on the conveyor belt 8, and preferably these means are connected with the control unit 22 so as to control the instant of activation of sensor 4.

Moreover, advantageously the data detected by the aforesaid measuring means 30 are sent to the processing unit 28 which is also configured to associate the corresponding color detected by means of sensor 4 with each area/position of the leather hide. Thereby, it is also possible to know the specific area of the leather hide 6 of which the color was detected.

Advantageously, a software is loaded and executed in the processing unit 28 which is conveniently configured so that the influence of the texture variations and/or the presence of creases or surface defects which inevitably are present on the leather hide 6, is significantly reduced and/or preferably eliminated in the corresponding color identified based on the detections performed by means of sensor 4.

In particular, to this end, the software is configured to execute the following operations:

remove, among all values of the three chromatic components XYZ and/or of the three preferably L*a*b* coordinates, transmitted by the optical sensor 4 to the processing unit 28 and related to the light radiation reflected from the leather hide 6 and captured by the sensor itself, the ones related to the portions of head and tail of the leather hide 6, which generally are full of creases, folds or other surface defects; thereby, a group of values is selected among all the ones acquired, calculate the average of each chromatic component and/or of each coordinate of the color space L*a*b*, of the sets of three values belonging to the group selected previously so as to thus obtain a single set of three values corresponding to the three averages of the chromatic components/coordinates; in greater detail, the average is calculated of all the components X of the sets of three values XYZ of the group selected previously, and the same is done for the components Y and Z; similarly, in the case of the color space L*a*b*, the average is calculated of all the coordinates L of the sets of three values L*a*b* of the group selected previously, and the same is done for the coordinates a* and b*;

identify the color corresponding to the values of the three average chromatic components/coordinates thus obtained.

Advantageously, to this end, the number of values to be removed because they are related to the portions of head and tail of the leather hide 6 is set by the operator by acting on an interface for managing the processing unit 28 and/or processor 29 and preferably indicating the length of the initial/final portion not to be considered. Conveniently, the length of the initial/final portion not to be considered is obtained based on that detected by the means 30 which measure the advancing of the leather hide 6 on the table or on the conveyor belt 8 and/or based on the trigger instants generated by the photocells when they detect the inlet/outlet of the leather hide at sensor 4, while considering as known the advancing speed of the leather hide 6 on the table or on the conveyor belt 8.

Figure 3:
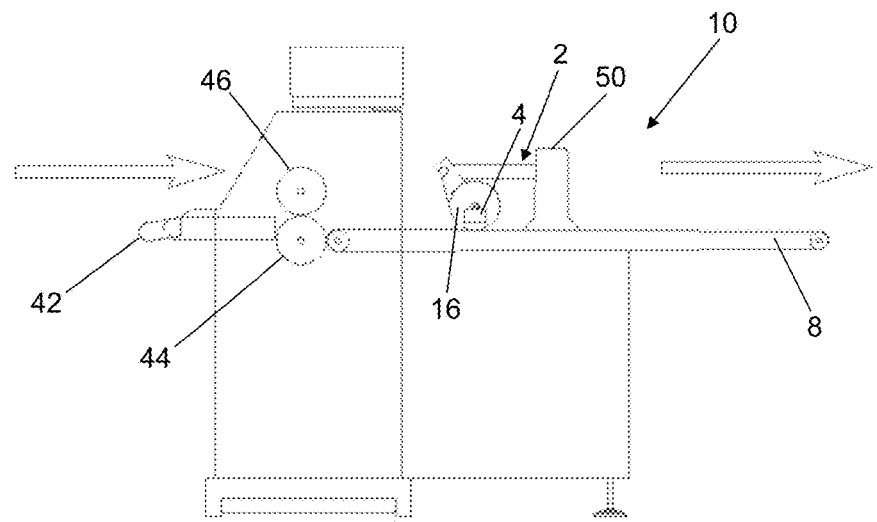
FIG. 3 shows a longitudinal vertical section of a machine for measuring the surface and/or thickness of leather hides, to which a device according to the invention is applied.
Figure 4:
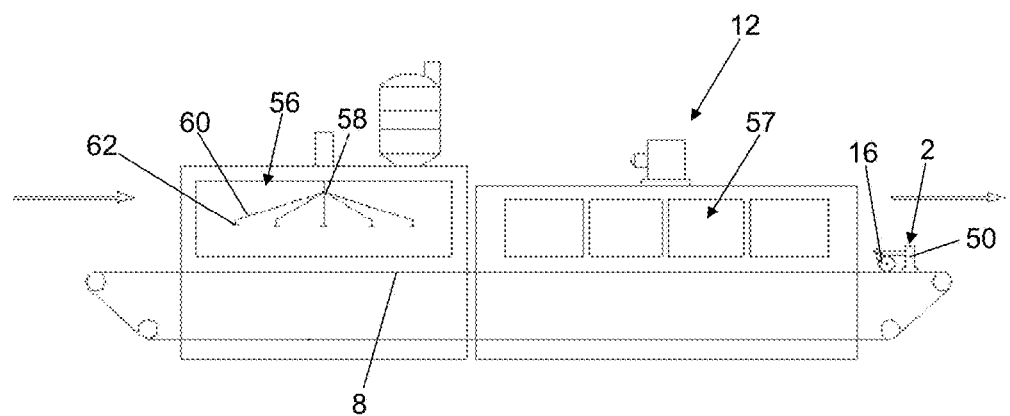
FIG. 4 shows a longitudinal vertical section of a plant for finishing leather hides, to which a device according to the invention is applied.

As illustrated in FIGS. 3 and 4, device 2 according to the invention may both be applied to a machine 10 for measuring leather hides and to a plant 12 for finishing leather hides; however, it may also be applied to other types of machines such as machines for stacking and/or for packaging leather hides, and/or to systems for selecting leather hides and more generally, to any conveyor belt provided in a plant for processing and/or managing leather hides.

In the embodiment shown in FIG. 3, device 2 according to the invention is applied to a measuring machine 10, which comprises a feeding table 42 on which a plurality of leather hides 6 is arranged, manually or by an apparatus upstream (not depicted), to be subjected to a measuring both of the surface area thereof and the thickness thereof.

The feeding table 42 is associated with a traction roller 44 and a measuring roller 46 of the surface of the leather hide. Downstream of these, there is provided a conveyor belt 8 on which device 2 according to the invention is installed. In particular, device 2 comprises a mechanical structure 50 which carries an idler roll 16, inside of which sensor 4 is accommodated, so that the idler roll is in contact with and stretches out the leather hide 6 on the supporting surface 7 defined on the conveyor belt 8.

In the embodiment shown in FIG. 4, device 2 according to the invention is applied to a finishing plant 12 which comprises a conveyor belt 8 on which a plurality of leather hides 6 to be processed, is arranged and stretched out.

The conveyor belt 8 crosses in sequence first a spraying cabin 56 and then a drying tunnel 57. In particular, a rotating structure 58 with a plurality of radial arms 60 provided with guns for spraying the colored pigment onto the leather hide advancing on the conveyor belt 8, is installed inside the spraying cabin 56.

Device 2 according to the invention is installed downstream of the drying tunnel 57. In particular, also in this case, device 2 comprises a mechanical structure 50 which carries an idler roll 16, inside of which sensor 4 is accommodated, so that the idler roll is in contact with and stretches out the leather hide on the supporting surface 7 defined on the conveyor belt 8.

The application of device 2 according to the invention to this type of plant is particularly advantageous because it allows the color of the leather hide to be detected in line and, due to the comparison performed by the processing unit between such a color detected and the reference one, it may be immediately detected if the coloring performed inside the spraying chamber is unsatisfactory in terms of quality/quantity, thus avoiding as well to spray the successive leather hides in an unsatisfactory manner.

From what is said, the device according to the invention is particularly advantageous, because:

it allows a reliable and precise detection of the color of the leather hide regardless of inevitable texture variations and/or also in the presence of creases or surface defects of the leather hide itself, it allows the color of all leather hides to be continuously and uninterruptedly detected and also checked, it allows the color of all leather hides of a given lot to be detected before starting a treatment and/or processing, and thus the homogeneity thereof to be assessed, it allows alarms to be promptly generated for anomalies relating to unsatisfactory spraying in terms of quality and/or quantity of the leather hides, it allows the quality of the final processed leather hide to be certified, it allows the color of the leather hide to be accurately identified, and also such a color to be associated with the leather hide for the identification thereof.

The invention claimed is:

1. A device (2) detecting colors of leather hides, which is installable on machines (10) or in plants (12) processing or managing leather hides, comprising:

a surface (7) adapted to support a leather hide (6), of which a color is to be detected;

a light source (18) adapted to emit a light radiation, which is emitted from said light source (18) and is reflected from said leather hide (6);

an optical sensor (4) adapted to capture the light radiation which is emitted from said light source (18) and is reflected from said leather hide (6) while advancing along said surface;

a member (16) positioned at said optical sensor (4), and keeping a distance constant between said optical sensor (4) and said leather hide (6) supported on said surface (7);

an optical filter (20) associated to said optical sensor (4) to extract values of chromatic components of said light radiation captured by said optical sensor (4); and a processing unit (28), which receives the values of said chromatic components and is configured to compare said values with preset reference values and/or to calculate and identify a corresponding color, wherein there is loaded and executed, inside the processing unit (28), a software configured to calculate and identify the corresponding color of said leather hide (6) according to detections made by the optical sensor (4) on the leather hide, said software being also configured to execute a processing that removes the chromatic components of portions of said leather hide having variations of texture or a presence of creases or surface defects, and wherein said member (16) arranged at said optical sensor (4), comprises at least one element that stretches out and keeps said leather hide uniformly in contact with said supporting surface (8).

2. The device according to claim 1, wherein said optical sensor (4) is accommodated inside a protective device which is transparent.

3. The device according to claim 1, wherein said member (16) arranged at said optical sensor (4) and keeping the distance constant between said leather hide (6) and said optical sensor (4), comprises an idler roll (16) supported and arranged so as to stretch out the leather hide (6) on said supporting surface (7, 8).

4. The device according to claim 3, wherein said sensor (4) is accommodated inside said idler roll (16), which is made of a transparent material and is provided with at least one opening at an area interposed between the optical sensor (4) and the leather hide (6) stretched out on said supporting surface (7).

5. The device according to claim 1, wherein said member (16) arranged at said optical sensor (4) and keeping the distance constant between said leather hide (6) and said optical sensor (4), comprises blower devices adapted to send jets of compressed air onto the leather hide (6) stretched out on said supporting surface (7).

6. The device according to claim 1, wherein said member (16) arranged at said optical sensor (4), for keeping the distance constant between said leather hide (6) and said optical sensor (4), comprises a lower roller that raises from below the leather hide of which the color is to be detected, with respect to said supporting surface (7), at said optical sensor (4).

7. The device according to claim 1, wherein said optical sensor (4) is associated to an actuator that varies a distance between said sensor (4) and the supporting surface (7) of said leather hide (6).

8. The device according to claim 1, wherein said light source (18) has an intensity stronger than external ambient light at the optical sensor (4).

9. The device according to claim 1, wherein said optical sensor (4) further comprises a mechanical diaphragm that reduces a detection area defined on the leather hide (6).

10. The device according to claim 1, wherein the optical filer (20) associated to said optical sensor (4) comprises a set of three bandpass filters, each of which is adapted to let a wavelength pass, which is different from a wavelength of the other two bandpass filters.

11. The device according to claim 1, further comprising a control unit (22) which controls an activation of the optical sensor (4) or of the light source (18).

12. The device according to claim 1, further comprising at least one detector configured to detect one or both of an inlet or an outlet of the leather hide at a sensing area of said optical sensor (4) or of the light source (18).

13. The device according to claim 1, wherein said processing unit (28) receives the values of said chromatic components and is configured to process said values to calculate corresponding values in a different color space.

14. The device according to claim 13, wherein said different color space is a color space L*a*b*.

15. The device according to claim 1, wherein said processing unit (28) is configured to provide a comparison of the values of the chromatic components of the light radiation reflected from the leather hide (6) and captured by the optical sensor (4) with values of a map of colors which was pre-saved in the processing unit, so as to identify a corresponding color among the colors.

16. The device according to claim 15, further comprising a measurement device that measures an advancement of the leather hide (6) on said surface (7, 8) on which the leather hide is supported, and wherein said measurement device is connected with said processing unit (28), which is also configured to associate the corresponding color identified with each area of the leather hide detected by said measurement device.

17. The device according to claim 1, wherein said software is configured to execute the following operations:
  removing, among all values of the chromatic components transmitted by the optical sensor (4) to the processing unit (28) and related to the light radiation reflected from the leather hide (6) and captured by the sensor, the chromatic components related to portions of head and tail of the leather hide (6) and thus select a group of values;
  calculating, for each chromatic component, an average of the values of the corresponding chromatic components belonging to a previously selected group so as to thus obtain a single set of three values representative of three average chromatic components/coordinates; and
  identifying the color corresponding to the values of the three average chromatic components thus obtained.

18. A machine (10) for measuring sizes of leather hides, and for processing and managing leather hides, comprising:
  a table or a conveyor belt (8); and
  a device (2) adapted to detect colors of the leather hides comprising:
  a surface (7) adapted to support a leather hide (6), of which a color is to be detected;
  a light source (18) adapted to emit a light radiation, which is emitted from said light source (18) and is reflected from said leather hide (6);
  an optical sensor (4) adapted to capture the light radiation which is emitted from said light source (18) and is reflected from said leather hide (6) while advancing along said surface;
  a member (16) positioned at said optical sensor (4), and keeping a distance constant between said optical sensor (4) and said leather hide (6) supported on said surface (7);
  an optical filter (20) associated to said optical sensor (4) to extract values of chromatic components of said light radiation captured by said optical sensor (4); and
  a processing unit (28), which receives the values of said chromatic components and is configured to compare said values with preset reference values and/or to calculate and identify a corresponding color,
  wherein there is loaded and executed, inside the processing unit (28), a software configured to calculate and identify the corresponding color of said leather hide (6) according to detections made by the optical sensor (4) on the leather hide, said software being also configured to execute a processing that removes the chromatic components of portions of said leather hide having variations of texture or a presence of creases or surface defects
  wherein said member (16) arranged at said optical sensor (4), comprises at least one element that stretches out and keeps said leather hide uniformly in contact with said supporting surface (8), and
  wherein said supporting surface (7) of said device (2) for said leather hide is defined at the table or the conveyor belt (8) of said machine (10).

19. A plant (12) for finishing leather hides comprising:
  a device (2) for detecting colors of leather hides comprising:
  a surface (7) adapted to support a leather hide (6), of which a color is to be detected;
  a light source (18) adapted to emit a light radiation, which is emitted from said light source (18) and is reflected from said leather hide (6);
  an optical sensor (4) adapted to capture the light radiation which is emitted from said light source (18) and is reflected from said leather hide (6) while advancing along said surface;
  a member (16) positioned at said optical sensor (4), and keeping a distance constant between said optical sensor (4) and said leather hide (6) supported on said surface (7);
  an optical filter (20) associated to said optical sensor (4) to extract values of chromatic components of said light radiation captured by said optical sensor (4); and
  a processing unit (28), which receives the values of said chromatic components and is configured to compare said values with preset reference values and/or to calculate and identify a corresponding color,
  wherein there is loaded and executed, inside the processing unit (28), a software configured to calculate and identify the corresponding color of said leather hide (6) according to detections made by the optical sensor (4) on the leather hide, said software being also configured to execute a processing that removes the chromatic components of portions of said leather hide having variations of texture or a presence of creases or surface defects,
  wherein said member (16) arranged at said optical sensor (4), comprises at least one element that stretches out and keeps said leather hide uniformly in contact with said supporting surface (8), and
  wherein said supporting surface (7) for said leather hide is defined at a table or at a conveyor belt (8) of said plant (12).

20. The plant according to claim 19, further comprising, in sequence:
  a spraying chamber; and
  a drying tunnel, wherein said device for detecting the colors of the leather hides (2) is installed at an outlet of said drying tunnel.

* * * * *